(12) United States Patent  (10) Patent No.: US 8,568,957 B2
Buntel et al.  (45) Date of Patent: Oct. 29, 2013

(54) DATA STORAGE MEDIA CONTAINING INORGANIC NANOMATERIAL DATA LAYER

(75) Inventors: Christopher J. Buntel, Spanish Fork, UT (US); Robert C. Davis, Provo, UT (US); Douglas P. Hansen, Spanish Fork, UT (US); Matthew R. Linford, Orem, UT (US); Barry M. Lunt, Provo, UT (US)

(73) Assignee: Brigham Young University, Provo, UT (US)

( * ) Notice: Subject to any disclaimer, the term of this patent is extended or adjusted under 35 U.S.C. 154(b) by 471 days.

(21) Appl. No.: 12/604,816

(22) Filed: Oct. 23, 2009

(65) Prior Publication Data

US 2010/0103795 A1  Apr. 29, 2010

Related U.S. Application Data

(60) Provisional application No. 61/197,103, filed on Oct. 23, 2008.

(51) Int. Cl.
*G11B 7/24*  (2013.01)

(52) U.S. Cl.
USPC ............ 430/270.12; 428/64.8; 369/288

(58) Field of Classification Search
None
See application file for complete search history.

(56) References Cited

U.S. PATENT DOCUMENTS

| | | | |
|---|---|---|---|
| 3,314,073 A | 4/1967 | Becker | |
| 3,474,457 A | 10/1969 | Becker | |
| 3,654,624 A | 4/1972 | Becker et al. | |
| 3,657,707 A | 4/1972 | McFarland et al. | |
| 3,665,483 A | 5/1972 | Becker et al. | |
| 3,852,067 A * | 12/1974 | Levy | 430/93 |
| 4,278,756 A | 7/1981 | Bouldin et al. | |
| 6,385,162 B1 * | 5/2002 | Nagase et al. | 369/288 |
| 6,607,845 B2 * | 8/2003 | Hirai et al. | 428/641 |
| 6,738,335 B1 | 5/2004 | Todori et al. | |
| 7,129,006 B2 * | 10/2006 | Hesselink et al. | 430/1 |
| 7,264,874 B2 * | 9/2007 | Ryang | 428/402 |
| 7,399,429 B2 | 7/2008 | Liu et al. | |
| 2001/0022769 A1 * | 9/2001 | Waki et al. | 369/172 |
| 2002/0106476 A1 | 8/2002 | Hirai et al. | |
| 2003/0193857 A1 * | 10/2003 | Ichihara et al. | 369/47.5 |
| 2005/0213485 A1 | 9/2005 | Hsaio et al. | |
| 2007/0077522 A1 * | 4/2007 | Satoh et al. | 430/270.11 |
| 2007/0112118 A1 * | 5/2007 | Park et al. | 524/492 |

(Continued)

FOREIGN PATENT DOCUMENTS

| | | | |
|---|---|---|---|
| JP | 61-177284 | * | 8/1986 |
| JP | 61-240449 | * | 10/1986 |

(Continued)

OTHER PUBLICATIONS

Issac et al., "Correlation between photoluminescence intermittency of CdSe quantum dots and self-trapped states in dielectric media" Phys. Rev. B. vol. 71 161302-1 to 161302-4 (2005).*

(Continued)

*Primary Examiner* — Martin Angebranndt
(74) *Attorney, Agent, or Firm* — Workman Nydegger

(57) ABSTRACT

Optical information media having a support substrate and an inorganic nanomaterial data layer are disclosed. The data layer provides enhanced stability and optical performance as compared to conventional data layers.

14 Claims, 3 Drawing Sheets

| Inorganic nanomaterial data layer | 15 |
|---|---|
| Substrate layer | 10 |

(56) References Cited

U.S. PATENT DOCUMENTS

| | | | |
|---|---|---|---|
| 2007/0116976 A1 | 5/2007 | Tan et al. | |
| 2007/0184385 A1* | 8/2007 | Tseng et al. | 430/270.12 |
| 2007/0195672 A1 | 8/2007 | Karns et al. | |
| 2007/0216981 A1 | 9/2007 | Matsumura et al. | |
| 2007/0242592 A1 | 10/2007 | Ortal | |
| 2008/0186837 A1* | 8/2008 | Hong et al. | 369/272.1 |
| 2008/0190325 A1* | 8/2008 | Kohler et al. | 106/499 |
| 2008/0213628 A1 | 9/2008 | Hailu et al. | |
| 2009/0075014 A1* | 3/2009 | Miki et al. | 428/64.4 |
| 2009/0099282 A1 | 4/2009 | Muller et al. | |

FOREIGN PATENT DOCUMENTS

| | | |
|---|---|---|
| JP | 2003039829 A | 2/2003 |
| JP | 2003077173 A | 3/2003 |
| WO | WO 2006/131497 | 12/2006 |

OTHER PUBLICATIONS

Kimura et al. "Near field optical recording on a CdSe nanocrystal thin film", Nanotech. vol. 14 pp. 69-72 (2003).*

Wang et al. Exciton-plasmon interactions in hybrid structures of semiconductor nanocrystals and metal disc arrays QTuD1.pdf, Proc. OSA-QELS 2 pages (May 2008).*

Zijlstra et al. "Effect of heat accumulation on the dynamic range of a gold nanorod doped polymer composite for optical laser writing and patterning", Opt. Exp. vol. 15(19) pp. 12151-12160 (Sep. 2007).*

Machine translation of JP 2003-039829 8 pages (2003).*

Haubold et al., "Strongly luminescent InP/ZnS core-shell nanoparticles", ChemPhysChem. vol. 2001(5) pp. 331-334 (2001).*

Xu et al. "Laserassisted forward transfer of multi-spectral nanocrystal quantum dot emitters", Nanotech. vol. 18 pp. 1-6 (2006).*

International Search Report, PCT/US2009/061859, Jun. 8, 2010.

Richang Lu, et al., "Stability Comparison of Recordable Optical Discs—A Study of Error Rates in Harsh Conditions", Sep./Oct. 2004, *J. Res. Natl. Inst. Stand. Technol.* vol. 109,pp. 517-524.

John Blan, "Storage expert warns of short life span for burned CDs," Jan. 10, 2006, *Computerworld Magazine* http://www.computerworld.com/s/article/107607/Storage_expert_warns_of_short_life_span_for_burned_CDs?nid=107607&taxonomyId=019&source=NLT_PM.

Chon, J.W.M. et al., "Two-photon-induced photoenhancement of densely packed CdSe/ZnSe/ZnS nanocrystal solids and its application to multilayer optical data storage", *Appl. Phys. Lett.* 85(23): S514-S516 (2004).

Li, X. et al., "Two-photon energy transfer enhanced three-dimensional optical memory in quantum-dot and azo-dye doped polymers", *Appl. Phys. Lett.* vol. 92, Iss. 6: 063309 pp. 1-3 (2008)).

Sun et al., "Transparent PMMA/ZnO Nanocomposite Films Based On Colloidal ZnO Quantum Dots", *Nanotechnology*, Issue 18, pp. 1-6, Apr. 27, 2007.

Gao, X. and Nie, S., "Quantum dot-encoded beads", *Methods in Molecular Biology* 303, pp. 61-71 (2005).

Sathe, T.R. et al., "Mesoporous silica beads embedded with semiconductor quantum dots and iron oxide nanocrystals: dual-function microcarriers for optical encoding and magnetic separation", *Anal. Chem.*, vol. 78, Iss. 16, pp. 5627-5632 (2006).

Khrenov, V. et al., "Surface Functionalized ZnO Particles Designed for the Use in Transparent Nanocomposites", *Macromol. Chem. Phys.* vol. 206, pp. 95-101, (2005).

Liu, P. et al., "Preparation and Characterization of PMMA/ZnO Nanocomposites via In-Situ Polymerization Method", *Journal of Macromolecular Science, Part B: Physics*, vol. 45, pp. 131-138, (2006).

Demir, M. et al., "PMMA/Zinc Oxide Nanocomposites Prepared by In-Situ Bulk Polymerization", *Macromol. Rapid Commun.*, vol. 27, pp. 763-770, (2006).

Zan, L. et al., "Organic modification on $TiO_2$ nanoparticles by grafting polymer", *Journal of Materials Science*, vol. 39, pp. 3261-3264, (2004).

Sidorenko, A. et al., "Radical Polymerization Initiated from a Solid Substrate, 3. Grafting from the Surface of an Ultrafine Powder", *Macromolecules*, vol. 32, pp. 4539-4543, Jul. 1999.

Liu, P. et al., "In situ radical transfer addition polymerization of styrene from silica nanoparticles", *European Polymer Journal*, vol. 40, pp. 267-271, (2004).

Zhang, B. et al., "A novel method to enhance quantum yield of silica-coated quantum dots for biodetection", *Nanotechnology*, vol. 19, pp. 1-9, (2008).

* cited by examiner

| Inorganic nanomaterial data layer | 15 |
| Intervening layer(s) | 20 |
| Substrate layer | 10 |

FIG. 2

| Second substrate layer | 25 |
| Inorganic nanomaterial data layer | 15 |
| First substrate layer | 10 |

FIG. 3

DATA STORAGE MEDIA CONTAINING INORGANIC NANOMATERIAL DATA LAYER

This application claims priority under 35 U.S.C. §119(e) to U.S. Provisional Patent Application Ser. No. 61/197,103, filed Oct. 23, 2008, the disclosure of which is incorporated by reference in its entirety.

BACKGROUND OF THE INVENTION

1. Field of the Invention

The invention relates to long-term digital data storage media, and more specifically, to materials and manufacturing processes that produce very stable digital data storage media. In particular, an optical disc containing an inorganic nanomaterial data layer is disclosed.

2. Description of Related Art

One of the major issues with data archiving is media longevity. The data storage methods used today are insufficient for data storage beyond 50 years, 100 years, or longer. This longevity dilemma, as seen from the archivist's point of view, has many facets and equally many plausible, but unfortunately flawed potential solutions. For example, one method of perceived long-term data storage is optical digital data storage discs. Optical digital data storage comes in many capacities and formats, including, but not limited to the disc capacities of CD, Mini-Disc, DVD, HD, and BLU-RAY DISC® (BD) with dozens of format variations within each disc capacity, the most common including R, +R, –RW, +RW, RAM, to name a few. Given the nature of the construction of these media, they appear impervious to aging and often carry long-life expectancy claims. Unfortunately, experimental data on the life expectancy of these media types contradicts such generous life estimates provided by some manufacturers. (See, for example, Stability Comparison of Recordable Optical Discs—A Study of Error Rates in Harsh Conditions, *J. Res. Natl. Inst. Stand. Technol.* 109, 517-524 (2004)).

Another frequently attempted solution for solving the longevity dilemma for long-term (typically greater than 5-7 years) retention and storage of digital data is to preserve data on magnetic media such as tape or a hard disk, and then to renew the stored data by re-copying the data onto a new tape or hard drive or optical storage disc on a periodic basis. Variations on this theme can be played using optical data storage technology of various data densities and formats. Further, while certain searchability issues maybe mitigated by data transition to optical format, continually re-writing previously archived data is not a workable solution. Transferring archival data from one volatile format to another of similar or even greater susceptibility is error prone and inherently risky. (See, for example, "Storage expert warns of short life span for burned CDs," John Blau, Computerworld Magazine, Jan. 10, 2006.) Cost is another facet of the problem. Archiving the amount of data generated by a company or other entity during any particular year may not be initially difficult or costly, but archival costs compound exponentially as the data from preceding years is repeatedly re-written to new media in addition to the integration of any new data.

The search for a solution to the longevity dilemma has led to the creation of new data storage technologies that focus on increasing a system's data storage recording rate and data density. Examples include: Oriented Nano-Structure (see U.S. Patent Application 2007/0195672 (published Aug. 23, 2007)), holographic (See U.S. Patent Application 2007/0216981 (published Sep. 20, 2007)), and multi-layer technology (See U.S. Patent Application 2007/0242592 (published Oct. 18, 2007)). In each case, the focus is on significantly higher data storage densities: approximately 150 gigabytes per disc for Oriented Nano-Structure, greater than 250 gigabytes per disc for holographic and approximately one terabyte per disc for multi-layer media technology. Furthermore, as will be discussed herein, neither expanded data capability, nor increased recording speeds have positively impacted this problem.

One issue with the technology path described above is that the new media capacities and formats suffer from the same age-degradation effects as the older media capacities and formats. The write methods embodied in the aforementioned technologies write the data in a similar means and use materials that are nearly identical to that of previous technology generations. The one significant change with each succeeding generation has been smaller feature sizes that permit higher data densities, but which also exacerbate age-degradation effects.

When introduced in 1964, writeable optical data storage devices used lasers to record an analog-wave signal in an ablatable write layer, usually made of a thin layer of aluminum or rhodium, on a Mylar-substrate filmstrip. (See, for example, U.S. Pat. No. 3,314,073). Unwritten portions were reflective and written portions were absorptive or transmissive to a read laser. Later patents by the same inventors suggested encoding digital holes in the ablatable layer (see, for example, U.S. Pat. No. 3,474,457), mounting the media on a drum (see, for example, U.S. Pat. No. 3,654,624), and increasing read and write reliability by adding surface defect and error checking (see, for example, U.S. Pat. No. 3,657,707). These high-energy data storage designs suffered in part because "[i]n selectively burning thick metal layer storage media with modulated laser energy, there is a tendency to burn or destroy the substrate on which the film or metal layer is coated." (See U.S. Pat. No. 3,665,483, column 3). The writing methods suggested by these early patents had the further disadvantage of depositing the ablative metal material on the writing optics, thereby effectively contaminating the write system.

Most CD and DVD –/+R formats today include low bleachable-energy dyes. The writing process occurs when a write laser increases the dye's internal energy to such a point that an irreversible chemical reaction occurs that either bleaches the dye, making the dye transparent, or "burns" the dye, making the dye more opaque to a read laser. Optical disc manufacturers select dyes, in part, for their ability to be easily bleached or burned at relatively low activation energies. These low bleachable-energy dyes suffer from the same or greater age degradation kinetics as those described above. Discs manufactured using these dyes may become unreadable in as few as three to five years. Hence, existing, low-energy melting or bleaching write processes make most modern optical media inappropriate as an archiving medium. Write layers requiring little energy to record an optical mark also require little energy to modify unwritten portions by natural chemical, thermal or environmental forces anytime after the initial recording.

Most commercial CD, DVD, and BD media use organic dyes in their data layer. Organic dyes are widely available and inexpensive, but suffer from poor longevity. Dyes can be oxidized over time, losing their fluorescent properties. Dyes on optical media can also be "bleached" by the laser that is used during the normal course of reading the data from the media. Bleaching chemically alters dyes such that they no longer function and are not detectable.

Ideally, to make an optical media disk suitable for archive purposes, the materials, write methods, and manufacturing processes preferably have significant immunity to thermal and chemical kinetic aging processes. The materials preferably are not subject to the age degradation effects that may eventually cause chemical or mechanical breakdown. The write process preferably requires sufficient energy such that the write layers' written portions are permanently modified and the unwritten portions are not and will not be easily modified through aging or other deterioration processes. Thus, in an ideal media, the write layer is permanently modified as written portions are completely ablated or removed and unwritten portions are not removable or changeable except through high-power writing processes.

Doubly coated core-shell nanocrystals have been used to spell letters A, B, and C in a solid film (Chon, J. W. M. et al., *Appl. Phys. Lett.* 85(23): 5514-5516 (2004)). The authors suggested that the technology was demonstrated to be feasible for application in multilayered optical data storage. Multilayer letters were also spelled using a mixture of a quantum dot and an azo-dye polymer (Li, X. et al., *Appl. Phys. Lett.* 92: 066309 (2008)).

It is therefore an object of the present invention to provide an optical medium for digital data that is suitable for archive purposes. It is additionally an object of the present invention to provide optical digital data storage media that is durable for extended periods of time, with a minimal period of time being 100 years, and a desirable period of time being several thousand years. It is more specifically an object of the present invention to use write layers and other materials in the optical media that are not easily modified and thus retain their permanency for long periods of time. Another object of the present invention is to provide an optical digital data storage media with a write layer that is ablatable or permanently modified through the writing process and a substrate or other disc layers that are not adversely affected by the writing process. It is also an object of the present invention to provide an archive-quality optical media that is compatible with one or more of the existing, widespread digital storage technologies or that is backwards compatible with existing CD, DVD, or BD optical data storage formats.

SUMMARY OF THE INVENTION

Archive-quality optical discs suitable for storing digital data for hundreds or even thousands of years are disclosed. The optical disc structure includes a support substrate and a data layer containing at least one inorganic nanomaterial.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

FIG. 2 shows an optical information medium having a substrate layer, at least one intervening layer, and an inorganic nanomaterial data layer.

FIG. 3 shows an optical information medium having a first substrate layer, an inorganic nanomaterial data layer, and a second substrate layer.

DETAILED DESCRIPTION OF THE INVENTION

Figure 1:
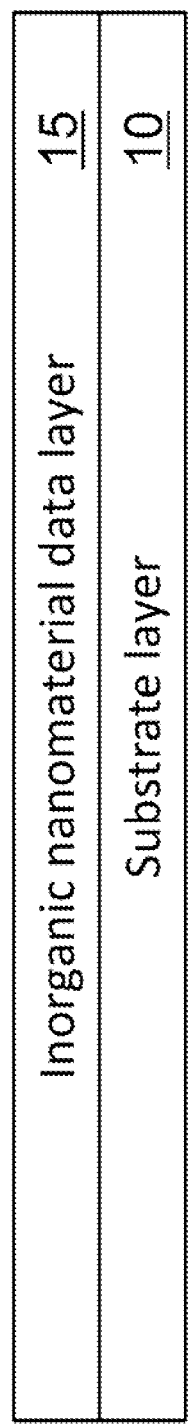
FIG. 1 shows an optical information medium having a substrate layer facially contacting an inorganic nanomaterial data layer.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups. Items referred to as being numbered "one or more" can be included once, or more than once.

Materials

One embodiment of the present invention comprises an optical information medium suitable for archival purposes. The materials and manufacturing processes are designed to be very durable and not subject to age-degradation effects to a substantial degree. Likewise, the information writing process is intended to be permanent and not subject to age degradation effects to a substantial degree. The medium includes at least one data layer 15 containing at least one inorganic nanomaterial, and commonly would further comprise at least one support substrate 10. In numerous embodiments, the medium contains a first support substrate and a second support substrate, where the at least one data layer is positioned between the first and second support substrates.

Nanomaterials are an attractive alternative to traditional organic dyes. Nanomaterials are significantly more resistant to water and oxidation in air. Nanomaterials are also more stable over time, allowing for long periods of storage. An additional significant advantage over organic dyes is their ability to be repeatedly excited for long periods of time without bleaching. This improved stability makes nanomaterials a superior choice for use in optical information media.

The optical information media can generally be any shape and size. The media are typically flat and round in shape. Currently envisioned sizes are about 8 cm diameter, about 12 cm diameter (like a conventional CD or DVD), about 13 cm diameter, about 20 cm diameter, about 10 inch (about 25.4 cm) diameter, about 26 cm diameter, and about 12 inch (about 30.48 cm) diameter.

A cross-section view of the optical information medium can be symmetrical or asymmetrical. The cross-section is most commonly asymmetrical.

The data layer 15 can comprise, consist essentially of, or consist of at least one inorganic nanomaterial. Examples of inorganic nanomaterials include semiconductor nanocrystals (commonly referred to as "quantum dots"), colloidal gold nanoparticles, silver nanoparticles, aluminum nanoparticles, palladium nanoparticles, platinum nanoparticles, metal oxides (such as visible light absorbing metal oxides CuO, $Cu_2O$, $VO_2$, and $Fe_2O_3$), metal nitrides, and metal carbides. Other nanomaterials can be used that exhibit the phenomenon of surface plasmons or Surface Plasmon Resonance in the wavelength range of about 300 nm to about 900 nm.

In certain embodiments, the data layer 15 can contain a mixture of two or more different inorganic nanomaterials. It is possible to selectively read or write individual inorganic nanomaterials, allowing for multiplexing of data.

The data layer 15 can further comprise at least one polymer, where the inorganic nanomaterial is dispersed within the polymer matrix. This can aid in production of the optical information medium, as well as increase stability of the inorganic nanomaterials. Examples of polymers include polystyrene, polyethylene, polypropylene, polyvinyl alcohol, polyvinylphenol, polydimethylsiloxane, polymethylmethacrylate, polymethylacrylate, polyacrylonitrile, polyacrylamide, polycarbonate, polyethers, epoxy resin, polybutadiene, polyacrylic acid, starch, polytetrafluoroethylene (PTFE), polyetheretherketone (PEEK), and crosslinked versions thereof. Crosslinking methods are well known to skilled artisans. Preparation of quantum dots dispersed in polymer microbeads has been reported. (See, for example, Gao, X. and Nie, S., *Methods in Molecular Biology* 303: 61-71 (2005)).

The data layer 15 can further comprise silica. In some embodiments, the inorganic nanomaterial is dispersed within the silica. Preparation of quantum dots dispersed in silica beads has been reported. (See, for example, Sathe, T. R. et al., *Anal. Chem.* 78(16): 5627-5632 (2006)).

Quantum dots typically comprise core nanocrystals, or core-shell nanocrystals, where a central core is prepared from one semiconductor material, and a surrounding shell is prepared from a different semiconductor material.

The core may be comprised of (a) a first element selected from Groups 2, 12, 13 or 14 of the Periodic Table of the Elements and a second element selected from Group 16 of the Periodic Table of the Elements. (b) a first element selected from Group 13 of the Periodic Table of the Elements and a second element selected from Group 15 of the Periodic Table of the Elements, or (c) a Group 14 element. Examples of materials suitable for use in the semiconductive core include, but are not limited to MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, HgTe, $Al_2S_3$, $Al_2Se_3$, $Al_2Te_3$, $Ga_2S_3$, $Ga_2Se_3$, GaTe, $In_2S_3$, $In_2Se_3$, InTe, SnS, SnSe, SnTe, PbS, PbSe, PbTe, AlP, AlAs, AlSb, GaN, GaP, GaAs, GaSb, InN, InP, InAs, InSb, InGaP, BP, Si, and Ge, and ternary and quaternary mixtures, compounds, and solid solutions thereof.

Alternative quantum dot formulations exist. For example, the core can be a III-V semiconductor material. (See, for example, U.S. Pat. No. 7,399,429). Examples of such a core include InP and InGaP. These formulations were designed to avoid use of toxic heavy metals such as cadmium. Accordingly, the inorganic nanomaterials can lack cadmium.

The semiconductor shell may be comprised of (a) a first element selected from Groups 2, 12, 13 or 14 of the Periodic Table of the Elements and a second element selected from Group 16 of the Periodic Table of the Elements, (b) a first element selected from Group 13 of the Periodic Table of the Elements and a second element selected from Group 15 of the Periodic Table of the Elements, or (c) a Group 14 element. Suitable shell materials include, but are not limited to, MgO, MgS, MgSe, MgTe, CaO, CaS, CaSe, CaTe, SrO, SrS, SrSe, SrTe, BaO, BaS, BaSe, BaTe, ZnO, ZnS, ZnSe, ZnTe, CdO, CdS, CdSe, CdTe, HgO, HgS, $Al_2O_3$, $Al_2S_3$, $Al_2Se_3$, $Al_2Te_3$, $Ga_2O_3$, $Ga_2S_3$, $Ga_2Se_3$, $Ga_2Te_3$, $In_2O_3$, $In_2S_3$, $In_2Se_3$, $In_2Te_3$, $SiO_2$, $GeO_2$, SnO, $SnO_2$, SnS, SnSe, SnTe, PbO, $PbO_2$, PbS, PbSe, PbTe, AlN, AlP, AlAs, AlSb, GaN, GaP, GaAs, GaSb, InN, BP, and ternary and quaternary mixtures and solid solutions thereof. Preferred shell materials are CdSe, CdS, ZnSe, ZnS, CdO, ZnO, $SiO_2$, $Al_2O_3$, and ZnTe. Optionally, in some embodiments, an organic or other overcoat selected to provide compatibility with a dispersion medium may surround the shell.

A "classic" quantum dot has a CdSe core and a ZnS shell.

A highly desirable feature of quantum dots is their unusual absorption and emission properties. Quantum dots absorb over a wide range of wavelengths, but emit in a very narrow wavelength range. Emission is typically characterized as having a small full width half max (FWHM). The emission spectrum is obtained, and the width of the emission at the half-height is determined. A small FWHM indicates a narrow emission range. FWHM values of less than about 40 nm are preferred. The particular emission wavelength ("color") of the quantum dot is tunable by altering the size of the quantum dot. In certain embodiments, quantum dots having the same chemical composition, but different sizes, will have different colored emissions. Example emission maxima include about 480 nm, about 520 nm, about 560 nm, about 590 nm, about 610 nm, about 625 nm, and about 640 nm. In other embodiments, the quantum dots are composition-tuned, rather than size-tuned to provide different colored emissions.

The nanoparticles embodied herein can generally be of any size and shape. The nanoparticles can be regular or irregular in shape. In various embodiments, the nanoparticles are spherical in shape, but they can also be rod-shaped or other non-spherical shapes.

The thickness of the data layer 15 provides optical absorption. The data layer 15 can generally be of any thickness. A lower thickness limit can be about 10 nm or about 20 nm. An upper thickness limit can be determined by the energy required to modify the data layer 15, and will vary depending on the material chosen. An example of an upper limit is about 500 nm. Example thicknesses are about 10 nm, about 20 nm, about 30 nm, about 40 nm, about 50 nm, about 60 nm, about 70 nm, about 80 nm, about 90 nm, about 100 nm, about 150 nm, about 200 nm, about 250 nm, about 300 nm, about 400 nm, about 500 nm, and ranges between any two of these values. A thickness value can be theoretically calculated as lambda/2n, where lambda is the read wavelength, and n is the index of refraction of the data layer 15.

The support substrate 10 can directly facially contact the data layer 15 without any intervening layer or layers, as shown in FIG. 1. Alternatively, one or more additional layers 20 can be placed between the support substrate 10 and the data layer 15, as shown in FIG. 2. The optical information medium can comprise a first substrate layer 10, an inorganic nanomaterial data layer 15 facially contacting the first substrate layer 10, and a second substrate layer 25 facially contacting the data layer 15. This type of "sandwich" design is shown in FIG. 3. The first substrate layer 10 and the second substrate layer 25 can be the same or different.

The support substrate 10, 25 can generally be any material compatible with use in optical information storage. In some embodiments, the support substrate 10, 25 can include polymers or ceramic materials having desirable optical and mechanical properties. For example, the support substrates 10, 25 may comprise polycarbonate, polystyrene, aluminum oxide, polydimethyl siloxane, polymethylmethacrylate, silicon oxide, glass, aluminum, stainless steel, or mixtures thereof. If substrate transparency is not desired, then metal substrates may be used. Other optically transparent plastics or polymers may also be used. Support substrates 10, 25 can be selected from materials having sufficient rigidity or stiffness. Stiffness is commonly measured as Young's modulus in units of pressure per unit area, and preferably is about 0.5 GPa to about 70 GPa. Specific examples of stiffness values are about 0.5 GPa, about 1 GPa, about 5 GPa, about 10 GPa, about 20 GPa, about 30 GPa, about 40 GPa, about 50 GPa, about 60 GPa, about 70 GPa, and ranges between any two of these values. Support substrates 10, 25 can be selected from materials having an index of refraction of about 1.45 to about 1.70. Specific examples of an index of refraction include about 1.45, about 1.5, about 1.55, about 1.6, about 1.65, about 1.7, and ranges between any two of these values.

In preferred embodiments, the support substrate 10, 25 comprises materials that are not subject to age degradation effects. Presently preferred materials include polycarbonate and silicon oxide (fused silica).

The support substrate 10, 25 can generally be any thickness. The substrate thickness can be selected as a function of the drive capacity: 1.2 millimeter-thick substrates are compatible with CD drives, 0.6 millimeter-thick substrates are compatible with DVD drives, and 0.1 millimeter-thick substrates are compatible with BD drives.

The index of refraction, thickness, and opacity of the substrate and the data layer may be optimized in the unwritten state to optically reflect a read laser. Light entering the bottom of the disc in the form of a read laser creates a first reflected beam from the support substrate/air interface and a second reflected beam from the support substrate/data layer interface. Adjusting the data layer thickness such that both reflected beams are in-phase maximizes reflection through constructive interference. Increased reflection at the disc's unwritten state can provide greater optical contrast between written and unwritten portions, increasing the signal-to-noise ratio in the read process.

The optical information medium often will comprise one support substrate, or both a first support substrate and a second support substrate. In cases where two support substrates are used, an adhesive layer is commonly used to adhere the second support substrate to the remainder of the optical information medium.

The optical information medium can further comprise one or more intervening layers located between any other layers in the medium. Examples of intervening layers include, but are not limited to, dielectric layers, reflective layers, tuning layers, and adhesive layers.

Methods of Preparation

Additional embodiments of the invention relate to methods of preparing an optical information medium. Generally, the methods can comprise providing a support substrate, and applying one or more additional layers to prepare the optical information medium.

The various layers can be applied in various orders, depending on the particular layering desired in the optical information medium product. In some embodiments, the layers are all applied on one side of the support substrate, resulting in a final product having the support substrate on one outer face. Alternatively, the layers can be applied onto both sides of the support substrate, resulting in a final product having the support substrate located such that it is not an outer face of the final product.

In certain embodiments, the methods can comprise providing a support substrate, and applying at least one inorganic nanomaterial to form a data layer onto at least one face of the support substrate such that the support substrate and data layer facially contact each other. In a presently preferred embodiment, the data layer is applied to one face of the support substrate. The support substrate can be any of the support substrates discussed above. In one presently preferred embodiment, the support substrate is polycarbonate. In another presently preferred embodiment, the support substrate is fused silica or glass.

In some embodiments, certain layers can be applied to a first support substrate, certain layers can be applied to a second support substrate, and the first support substrate and the second support substrate can be facially joined or adhered. This method is particularly attractive for the preparation of DVD media.

In an alternative embodiment, the method of preparing an optical information medium can comprise providing a first support substrate, applying at least one inorganic nanomaterial to form a data layer such that the data layer facially contacts the first support substrate, and applying a second support substrate such that the second support substrate facially contacts the data layer.

In various embodiments, one or more intervening layers can be added between any other layers in the medium. Examples of intervening layers include, but are not limited to, dielectric layers, reflective layers, tuning layers, and adhesive layers.

The applying at least one inorganic nanomaterial step can be performed in a variety of ways. The following are several examples of suitable methods. One method is to dissolve or suspend the nanomaterial in at least one solvent, and spin coat the solution onto a substrate. A second method is to dissolve or suspend the nanomaterial in at least one polymer, and spin coat the solution onto a substrate. A third method is to dissolve or suspend the nanomaterial in at least one polymer, add at least one crosslinking agent, and spin coat the solution onto a substrate. Crosslinking can be chemical, thermal, or photochemical. A fourth method is to dissolve or suspend the nanomaterial in a precursor solution for an inorganic (or mostly inorganic) glass. The solution can be spun onto a surface. Upon curing and solvent evaporation, a thin film of nanoparticles embedded in a glass layer would be formed. A fifth method would be to dissolve or suspend the nanomaterial in at least one solvent, and spray coat the solution onto a substrate. In all of these methods, an alternative would be to combine the nanomaterial with a monomer, and then polymerize the monomer/nanomaterial mixture.

In cases when a solvent is used, an unreactive layer may be applied underneath the data layer to protect the optical data medium from reacting with the solvent. For example, a layer of silicon dioxide ($SiO_2$), titanium dioxide ($TiO_2$), zirconium dioxide ($ZrO_2$), or silicon (Si) can be added between a polycarbonate substrate and the data layer if a solvent such as toluene is used to apply the nanoparticles. In the absence of an unreactive layer, toluene can react with and discolor polycarbonate.

Methods of Use

Any of the above described optical data mediums can be used to store digital data. According to various embodiments of the invention, methods of storing digital data can comprise providing an optical data medium comprising: at least one support substrate, and at least one data layer comprising at least one inorganic nanomaterial, and applying energy to sites in the data layer to cause a detectable change in the data layer. The method can further comprise detecting the change in the data layer. The detection can be either detecting a change in the reflectance of the media caused by absorption by the nanomaterial, or detecting fluorescence emitted from the nanomaterial.

Lasers can be used in the applying energy step and in the detecting step. Main classes of lasers include gas, diode-pumped solid state, and diode lasers.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Materials

Polycarbonate blank discs are commercially available from a variety of sources such as Bayer Material Science AG (Leverkusen, Germany), General Electric Company (Fairfield, Conn.), and Teijin Limited (Osaka, Japan). Fused silica blank discs are commercially available from a variety of sources such as Corning Incorporated (Corning, N.Y.), Hoya Corporation (Tokyo, Japan), and Schott AG (Mainz, Germany).

Semiconductor nanocrystals are commercially available from a variety of sources including Nanoco Technologies Ltd. (Manchester, UK), Molecular Probes, Inc. (Eugene, Oreg.), and Sigma Aldrich (St. Louis, Mo.). Aluminum nanoparticles and silver nanoparticles are commercially available from American Elements (Los Angeles, Calif.). Gold nanoparticles (sometimes referred to as colloidal gold) are commercially available from Nanocos Inc. (New York, N.Y.).

Prophetic Example 2

Preparation of Disc Containing Nanomaterial Data Layer

GREEN NANODOT™ 530 CdSe—ZnS nanocrystals (Nanoco Technologies; Manchester, UK) can be suspended in ethanol and spin coated onto a fused silica blank disc.

Prophetic Example 3

Preparation of Disc Containing Nanomaterial Data Layer

LUMIDOT™ 420 CdS nanocrystals (Sigma Aldrich; St. Louis, Mo.) can be suspended in hexane and spin coated onto a polycarbonate blank disc.

Example 4

Measurement of Disc Durability

Simple tests to measure durability include immersion of the sample in boiling water for 48 hours, and a tape-pull adhesion test. A more complex degradation test is specified in ECMA-379 (also known as ISO-IEC-10995).

All of the materials and/or methods and/or processes and/or apparatus disclosed and claimed herein can be made and executed without undue experimentation in light of the present disclosure. All of the patents and references cited herein are incorporated by reference in their entireties to the extent that such patents and references are not inconsistent with the explicit teachings of this specification. While the compositions and methods of this invention have been described in terms of preferred embodiments, it will be apparent to those of skill in the art that variations may be applied to the materials and/or methods and/or apparatus and/or processes and in the steps or in the sequence of steps of the methods described herein without departing from the concept and scope of the invention. More specifically, it will be apparent that certain materials which are both chemically and optically related may be substituted for the materials described herein while the same or similar results would be achieved. All such similar substitutes and modifications apparent to those skilled in the art are deemed to be within the scope and concept of the invention.

What is claimed is:

1. A method of storing digital data, the method comprising:
    providing an optical information medium comprising:
        at least one support substrate formed into a disc; and
        at least one data layer supported by the substrate, the data layer including a core-shell semiconductor nanocrystal; and
    writing to the data layer by applying sufficient laser energy to ablate the core-shell semiconductor nanocrystal to cause a change in the reflectivity of the optical information medium.

2. The method of claim 1, further comprising detecting the change in the data layer.

3. A method as in claim 2, wherein the data layer has a thickness of lambda/2n, where lambda is the read wavelength, and n is the index of refraction of the data layer.

4. The method of claim 1, wherein the support substrate facially contacts the data layer.

5. The method of claim 1, wherein the support substrate comprises polycarbonate, polystyrene, aluminum oxide, polydimethyl siloxane, polymethylmethacrylate, silicon oxide, glass, fused silica, aluminum, stainless steel, or mixtures thereof 6. The method of claim 1, wherein the support substrate comprises polycarbonate, glass, or fused silica.

7. The method of claim 1, wherein:
    the core semiconductor comprises MgS, MgSe, MgTe. CaS, CaSe, CaTe, SrS, SrSe, SrTe, BaS, BaSe, BaTe, ZnS, ZnSe, ZnTe, CdS, CdSe, CdTe, HgS, HgSe, HgTe, $Al_2S_3$, $Al_2Se_3$, $Al_2Te_3$, $Ga_2S_3$ $_5$ $Ga_2Se_3$ $_5$ GaTe, $In_2S_3$, $In_2Se_3$, InTe, SnS, SnSe, SnTe, PbS, PbSe, PbTe, AlP, AlAs, AlSb, GaN, GaP, GaAs, GaSb, InN, InP, InAs, InSb, InGaP, BP, Si, or Ge.

8. The method of claim 7, wherein the quantum dot lacks cadmium.

9. The method of claim 1, wherein:
    the core and the shell are different semiconductor materials;
    the core comprises MgS, MgSe, MgTe, CaS, CaSe, CaTe, SrS, SrSe. SrTe, BaS, BaSe, BaTe, ZnS, ZnSe, ZnTe, CdS, CdSe, CdTe, HgS, HgSe, HgTe, $Al_2S_3$, $Al_2Se_3$, $Al_2Te_3$, $Ga_2S_3$, $Ga_2Se_3$, GaTe, $In_2S_3$, $In_2Se_3$, InTe, SnS, SnSe, SnTe, PbS, PbSe, PbTe, AlP, AlAs, AlSb, GaN, GaP, GaAs, GaSb, InN, InP, InAs, InSb, InGaP, BP, Si, or Ge; and
    the shell comprises MgO, MgS, MgSe, MgTe, CaO, CaS, CaSe, CaTe, SrO, SrS, SrSe, Sae. BaO, BaS, BaSe, BaTe, ZnO, ZnS, ZnSe, ZnTe, CdO, CdS. CdSe, CdTe. HgO, HgS, $Al_2O_3$, $Al_2S_3$, $Al_2Se_3$, $Al_2Te_3$, $Ga_2O_3$, $Ga_2S_3$, $Ga_2Se_3$, $Ga_2Te_3$, $In_2O_3$, $In_2S_3$, $In_2Se_3$, $In_2Te_3$, $SiO_2$, $GeO_2$, SnO, $SnO_2$, SnS, SnSe, SnTe, PbO, $PbO_2$, PbS, PbSe, PbTe, AlN, AlP, AlAs, AlSb, GaN, GaP, GaAs, GaSb, InN, or BP.

10. The method of claim 1, wherein:
    the core and the shell are different semiconductor materials;
    the core comprises CdSe, CdTe, CdS, ZnSe, InP, InAs, or PbSe; and the shell comprises CdSe, CdS, ZnSe, ZnS, CdO, ZnO, $SiO_2$, $Al_2O_3$, or ZnTe.

11. The method of claim 1, wherein the semiconductor quantum dot is a CdSe—ZnS core-shell quantum dot.

12. The method of claim 1, wherein the data layer further comprises at least one polymer.

13. The method of claim 1, wherein the data layer further comprises written portions optically transparent or optically opaque to a read laser.

14. The method of claim 1, wherein the optical information medium further comprises at least one dielectric layer, at least one reflective layer, at least one tuning layer, at least one adhesive layer, or combinations thereof.

* * * * *